(12) United States Patent
Iwamoto (10) Patent No.: US 12,060,856 B2
(45) Date of Patent: Aug. 13, 2024

(54) CANISTER

(71) Applicant: FUTABA INDUSTRIAL CO., LTD., Okazaki (JP)

(72) Inventor: Koji Iwamoto, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 18/446,060

(22) Filed: Aug. 8, 2023

(65) Prior Publication Data

US 2024/0068429 A1 Feb. 29, 2024

(30) Foreign Application Priority Data

Aug. 25, 2022 (JP) ................................. 2022-134061

(51) Int. Cl.
*F02M 25/08* (2006.01)
*B01D 53/04* (2006.01)

(52) U.S. Cl.
CPC ..... *F02M 25/0854* (2013.01); *B01D 53/0446* (2013.01); *B01D 2253/102* (2013.01); *B01D 2257/702* (2013.01); *B01D 2259/4516* (2013.01)

(58) Field of Classification Search
CPC ............ F02M 25/0854; B01D 53/0446; B01D 2253/102; B01D 2257/702; B01D 2259/4519; B01D 53/0415
See application file for complete search history.

(56) References Cited

U.S. PATENT DOCUMENTS

| 8,015,965 | B2 * | 9/2011 | Yamasaki .......... F02M 25/0854 123/519 |
| 9,005,352 | B2 * | 4/2015 | Mani .................. F02M 25/0854 96/132 |
| 11,701,611 | B2 * | 7/2023 | Iwamoto ............. B60K 15/035 96/147 |
| 2011/0039881 | A1 * | 2/2011 | Singh ..................... A61K 9/006 514/300 |
| 2012/0304865 | A1 | 12/2012 | Sugiura et al. |
| 2013/0000610 | A1 | 1/2013 | Yamamoto et al. |
| 2018/0163671 | A1 | 6/2018 | Iwamoto |

FOREIGN PATENT DOCUMENTS

| JP | 2012251431 A | 12/2012 |
| JP | 2013011249 A | 1/2013 |
| JP | 6591955 B2 | 10/2019 |

OTHER PUBLICATIONS

Notice of Reasons for Refusal for Japanese Patent Application No. 2022-134061 dated May 14, 2024 (8 pages including translation).

* cited by examiner

*Primary Examiner* — Syed O Hasan
(74) *Attorney, Agent, or Firm* — Withrow + Terranova, PLLC; Vincent K. Gustafson (57) ABSTRACT

A canister is provided. The canister includes an inflow port, adsorbents, an atmosphere port, an outflow port, and an adjustment member. The adjustment member includes rod-like members. The adjustment member includes a positioning member configured to enable positioning of the adjustment member in a target chamber by being insertable in a second cylinder and by not being insertable in a first cylinder. The second cylinder has a cylindrical shape, the cross sectional area of which is larger than a cross sectional area of the first cylinder.

6 Claims, 7 Drawing Sheets

CANISTER

CROSS-REFERENCE TO RELATED APPLICATIONS

This application claims the benefit of Japanese Patent Application No. 2022-134061 filed on Aug. 25, 2022 with the Japan Patent Office, the entire disclosure of which is incorporated herein by reference.

BACKGROUND

This disclosure relates to a canister.

Canisters in which adsorbents, such as activated carbons, are disposed is known. Patent Document 1 listed below discloses a canister including an adjustment member that is arranged together with adsorbents. The adjustment member includes elongated rod-like members and a coupling member. The coupling member is arranged to couple one end of one of the rod-like members with one end of another one of the rod-like members. Flow of fuel vapor and purge air that have flown in the canister is facilitated in the vicinity of each rod-like member.

PRIOR ART DOCUMENTS

Patent Documents

Patent Document 1: Japanese Patent No. 6591955

SUMMARY

In a canister, the higher the uniformity of the gas flow velocity is in a width direction (in other words, a direction orthogonal to a gas-flow direction) of a chamber, which is filled with adsorbents, the better the adsorption performance of the adsorbents is exhibited. The reason being that the adsorbents arranged in an area where the gas flow velocity is high quickly adsorb a large amount of fuel vapor; and thus the adsorption capacity of such adsorbents is quickly reduced. Accordingly, the fuel vapor is not adsorbed and breakthrough is observed in such area where the gas flow velocity is high even if there is enough adsorption capacity left in the adsorbents arranged in an area where the gas flow velocity is low. The uniformity of the gas flow velocity decreases as the ratio of the area occupied by an adjustment member increases in a cross-section of the chamber taken in a direction orthogonal to the gas-flow direction. Since the canister of Patent Document 1 includes two or more rod-like members, the ventilation resistance is sufficiently reduced. However, it is still desired to better reduce the breakthrough of the fuel vapor and to favorably perform adsorption and desorption of the fuel. It is therefore desired to arrange the adjustment member at the intended positions without misalignment.

One aspect of the present disclosure provides a technique that enables an arrangement of the adjustment member at a specified position.

One aspect of the present disclosure is a canister including at least one chamber and mounted to a vehicle having an engine. The canister comprises an inflow port, adsorbents, an atmosphere port, an outflow port, and an adjustment member. The inflow port is configured to introduce fuel vapor from a fuel tank of the vehicle to the at least one chamber.

The adsorbents are configured to adsorb the fuel vapor and disposed in each of the at least one chamber. The atmosphere port is configured to introduce atmospheric air from outside of the vehicle to the at least one chamber. The outflow port is configured to release the fuel vapor adsorbed onto the adsorbents towards the engine using atmospheric air entered from the atmosphere port.

The adjustment member comprises rod-like members. The adjustment member is disposed with the adsorbents in a target chamber. The target chamber is at least one of the at least one chamber and is coupled to a target port. The target port is at least one of the inflow port, the atmosphere port, or the outflow port.

The target chamber comprises at least a first cylinder, a second cylinder, and a joining portion. The first cylinder has a cylindrical shape and forms a part of the wall surface of the target chamber. The second cylinder has a cylindrical shape and disposed away from the first cylinder when viewed from the target port. A cross sectional area at a cross section of the second cylinder is larger than a cross sectional area at a cross section of the first cylinder. The cross section here means any cross section taken orthogonally to the flow direction of the fuel vapor and the atmospheric air.

The joining portion has a cylindrical shape and disposed between the first cylinder and the second cylinder. A cross sectional area of the joining portion increases towards a direction moving away from the target port. The adjustment member comprises a positioning member configured to enable positioning of the adjustment member in the target chamber by being insertable in the second cylinder and by not being insertable in the first cylinder.

In such a configuration, since the positioning member is not insertable in the first cylinder, it is possible to inhibit the adjustment member from moving towards the target port. As a result, it is possible to dispose the adjustment member at a specified position so that the adjustment member is not too close to the target port.

In one aspect of the present disclosure, at least one projecting portion may be formed on an inner-circumferential surface of the joining portion. The at least one projecting portion is configured to inhibit the adjustment member from moving towards the target port by abutting the positioning member. In such a configuration, since at least one projecting portion abuts the positioning member, it is possible to increase the stability in fixing the adjustment member.

In one aspect of the present disclosure, the target chamber may comprise a buffer area, which is an area by the target port. A cross sectional area of the rod-like members at a cross section of the buffer area may be smaller than a cross sectional area of the rod-like members at a cross section of the target chamber taken further away from the target port than the buffer area.

In such a configuration, since the number of the adjustment member disposed in the buffer area, which communicates with the target port, is small, it is possible to maintain high uniformity of the flow velocity of the atmospheric air and fuel vapor in the buffer area. If a relatively large amount of the fuel vapor passes in the vicinity of the adjustment member with low uniformity of the flow velocity, the adsorbents near the adjustment member reach the point of saturation, where they cannot adsorb any more fuel vapor, relatively early. In such a case, the fuel vapor passes around the adsorbents without being adsorbed by the adsorbent. However, the aforementioned configuration makes it possible to favorably reduce the amount of the fuel vapor that passes through the buffer area without being adsorbed by the adsorbent.

In a case where the buffer area is situated in an area communicating with the target port, it is more possible to reduce the breakthrough of the fuel vapor than in a case where the buffer area is not situated in an area communicating with the target port. Accordingly, it is possible to reduce the ventilation resistance of the canister while inhibiting the breakthrough of the fuel vapor.

In one aspect of the disclosure, the buffer area may be an area where the adjustment member is not disposed. In such a configuration, since the adjustment member is not disposed in the buffer area, it is possible to favorably inhibit a decrease in uniformity of flow velocity caused by the rod-like members. Accordingly, the breakthrough of the fuel vapor can be more favorably inhibited.

In one aspect of the disclosure, the positioning member may be formed annularly to fit along an inner-circumferential surface of the second cylinder. In such a configuration, the positioning member can abut any part of the projecting portion, for example. Accordingly, it is possible to avoid a situation where the adjustment member cannot be fixed due to misalignment of the positioning member and the projecting portion when assembling the adjustment member in the target chamber.

In one aspect of the present disclosure, a thickness of the positioning member measured along its cross section may decrease towards the second cylinder from the first cylinder. In such a configuration, it is possible to make the flow of the atmospheric air and the fuel vapor smooth from the first cylinder to the second cylinder in the vicinity of the positioning member.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Embodiment 1-1. Configuration

Figure 1:
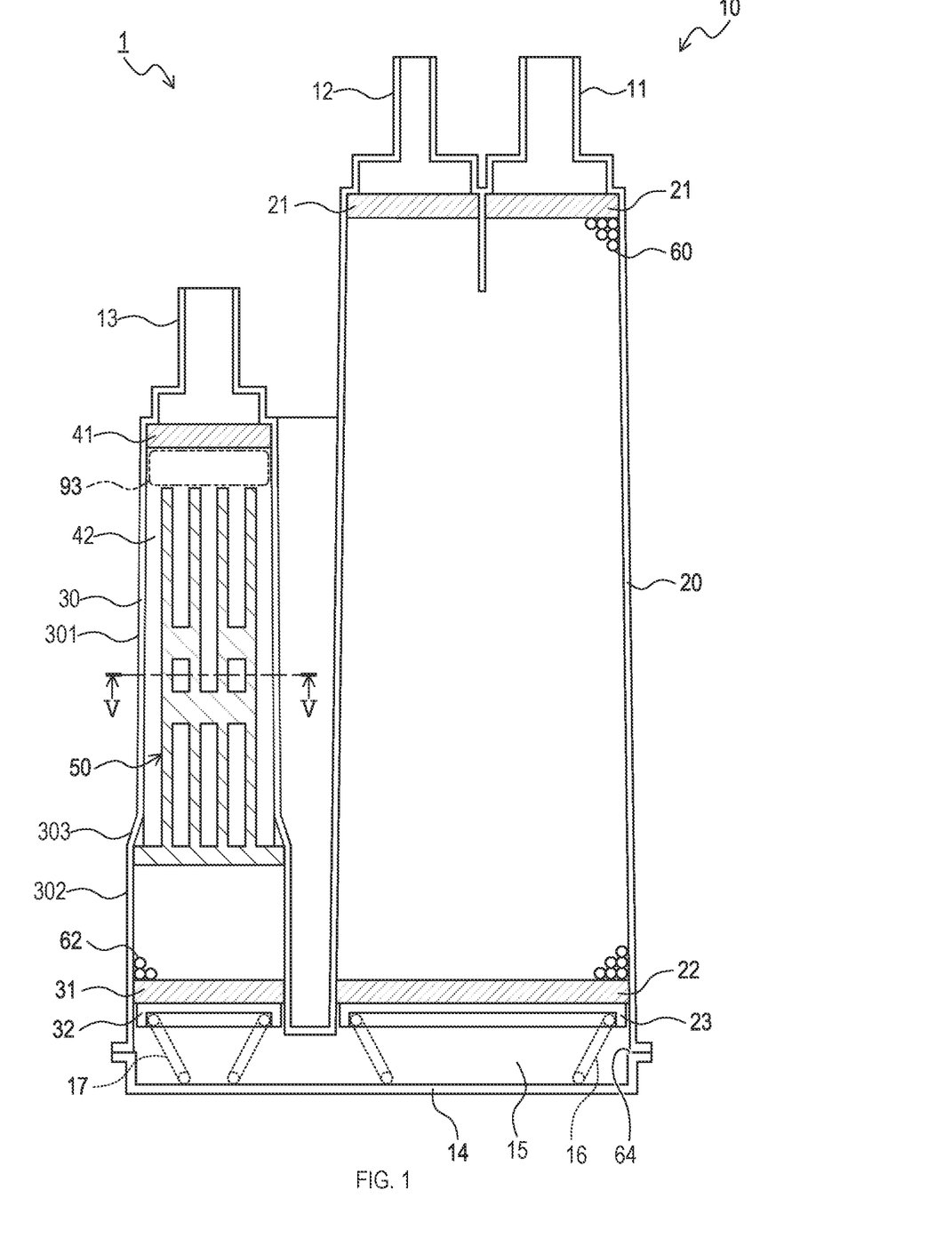
FIG. 1 is a vertical cross sectional view, taken from a lateral side, of a canister of an embodiment.

A canister 1 of the embodiment shown in FIG. 1 is configured to be mounted to a vehicle comprising an engine (illustration is omitted). The canister 1 comprises a casing 10 made of a synthetic resin. The casing 10 comprises a first chamber 20 and a second chamber 30 both having an inner space. The inner space of each chamber comprises adsorbents 60, 62 arranged to adsorb fuel vapor. The adsorbents 60, 62 are aggregate of powdery or granular substances. The substances may be, for example, activated carbons or substances generated from the activated carbons. The substances may also be, for example, substances other than the activated carbons as long as they have an ability to adsorb the fuel vapor.

One end of the casing 10 comprises an inflow port 11, an outflow port 12, and an atmosphere port 13. The inflow port 11 and the outflow port 12 communicate the inner space of the first chamber 20 with outside of the casing 10. The atmosphere port 13 communicates the inner space of the second chamber 30 with the outside of the casing 10.

The inflow port 11 is coupled to a fuel tank of the vehicle (illustration is omitted) to introduce the fuel vapor to each chamber of the canister 1. The fuel tank includes fuel accumulated to be supplied to the engine of the vehicle. The fuel vapor generated from the fuel is introduced to the interior of the canister 1 through the inflow port 11 and adsorbed by the adsorbents 60, 62 arranged in each chamber. The fuel is thereby accumulated in the interior of the canister 1.

The outflow port 12 is coupled to an intake pipe (illustration is omitted) of the engine of the vehicle. The outflow port 12 releases the fuel vapor adsorbed by the adsorbents 60, 62 towards the engine using atmospheric air entered from the atmosphere port 13. The atmosphere port 13 communicates with outside of the vehicle. A negative intake air pressure of the engine causes the atmospheric air (hereinafter referred to as purge air) to enter each chamber of the canister 1 through the atmosphere port 13. This inflow of the purge air causes the fuel adsorbed onto the adsorbents 60, 62 to desorb. Thus desorbed fuel is discharged from the outflow port 12 with the purge air towards the intake pipe. This removes the fuel adsorbed by the activated carbons and reproduces the activated carbons. The reproduction of the activated carbons in such manner is called purging.

The configuration of the canister 1 will be explained next in detail. Hereinafter, the end of the casing 10 of the canister 1 where the inflow port 11, the outflow port 12, and the atmosphere port 13 are situated is called a port side. The casing 10 comprises an opening 64 on its end opposite the port side. The opening 64 is closed with a lid member 14. Hereinafter, the end of the casing 10 opposite the port side (in other words, an end of the casing 10 where the lid member 14 is situated) is called a lid side.

The first chamber 20 has, for example, an approximately rectangular parallelepiped shape, or a circular cylindrical shape. An end of the first chamber 20 on the port side communicates with the inflow port 11 and the outflow port 12. A filter 21 is arranged at the end of the first chamber 20 on the port side. A filter 22 is arranged at another end of the first chamber 20 on the lid side. The adsorbents 60 are disposed between the filter 21 and the filter 22. Although the adsorbents 60 are filled in the entire space between the filter 21 and the filter 22, only some portions of the adsorbents 60 are shown in the drawings. The adsorbents 60 are illustrated in the same manner in other chambers.

The end of the first chamber 20 on the lid side communicates with a communicating passage 15. The communicating passage 15 extends along the lid member 14 so as to have the first chamber 20 communicate with the second chamber 30. A porous plate 23, permeable to the fuel vapor and the purge air, is disposed between the filter 22, arranged at the end of the first chamber 20 on the lid side, and the communicating passage 15. Coil springs 16 are disposed between the porous plate 23 and the lid member 14. The coil springs 16 push the porous plate 23 towards the port side. In the interior of the canister 1, fluid can move between the first chamber 20 and the second chamber 30 through the communicating passage 15.

The second chamber 30 has an elongated shape as a whole, extending from the communicating passage 15 to the atmosphere port 13. In the present embodiment, the second chamber 30 has, for example, a rectangular parallelepiped shape. Nevertheless, the second chamber 30 may have a different shape. For example, the second chamber 30 may have a circular cylindrical shape.

The second chamber 30 at least comprises a first cylinder 301, a second cylinder 302, and a joining portion 303. The first cylinder 301 is a cylindrical portion forming a part of a wall surface of the second chamber 30. More specifically, the first cylinder 301 is a wall surface of the second chamber 30 that couples to the end of the second chamber 30 on the port side. The second cylinder 302 is also a cylindrical portion forming a part of the wall surface of the second chamber 30. The second cylinder 302 is situated away from the atmosphere port 13 compared with the first cylinder 301. The second cylinder 302 includes a portion the cross-sectional area of which is greater than a cross-sectional area of the first cylinder 301. The cross section here means any cross section taken orthogonally to the flow direction of the fuel vapor and the atmospheric air. In other words, the cross section is a cross-sectional surface of the canister 1 taken by cutting the canister 1 along any virtual plane orthogonal to the flow direction of the purge air and the fuel vapor. Hereinafter, "the flow direction of the purge air and the fuel vapor" will be simply referred to as the flow direction.

The joining portion 303 is also a cylindrical portion forming a part of the wall surface of the second chamber 30. The joining portion 303 is disposed between the first cylinder 301 and the second cylinder 302. The joining portion 303 forms a portion the cross sectional area of the inner space of which expands along a direction moving away from the atmosphere port 13. For example, the joining portion 303 is formed into a tapered shape, and a cross-sectional area of an inner space of the joining portion 303 surrounded by an inner-circumferential surface gradually decreases towards the first cylinder 301. The first cylinder 301, the joining portion 303, and the second cylinder 302 are arranged in this order from the port side.

The end of the second chamber 30 on the port side communicates with the atmosphere port 13. A filter 31 is arranged at an end of the second chamber 30 on the lid side. A filter 41 is arranged at the end of the second chamber 30 on the port side. The adsorbents 62 are disposed in the second chamber 30 between the filter 31 and filter 41.

A porous plate 32, permeable to the fuel vapor and the purge air, is disposed between the filter 31, arranged at the end of the second chamber 30 on the lid side, and the communicating passage 15. Coil springs 17 are disposed between the porous plate 32 and the lid member 14. The coil springs 17 push the porous plate 32 towards the port side.

Figure 2A:
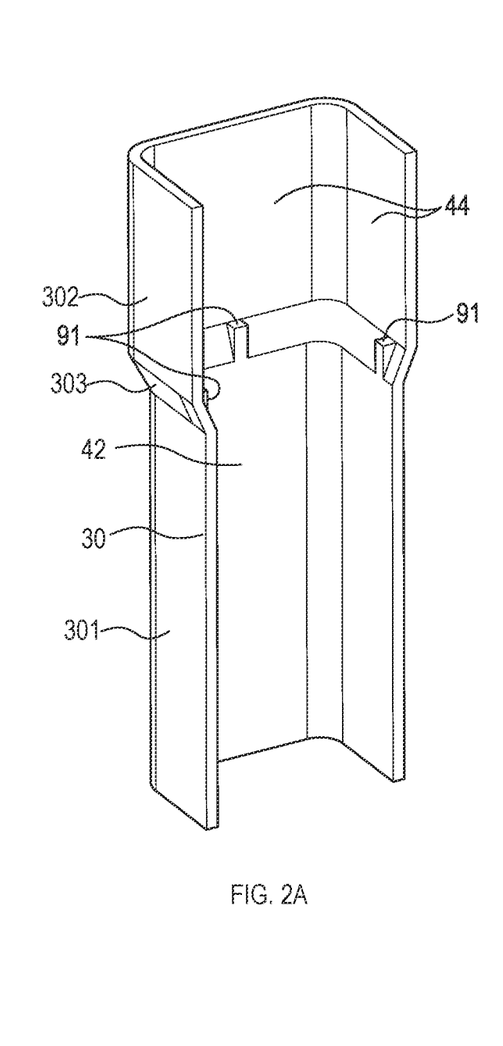
FIG. 2A is a cross-sectional perspective view of a second chamber.
Figure 2C:
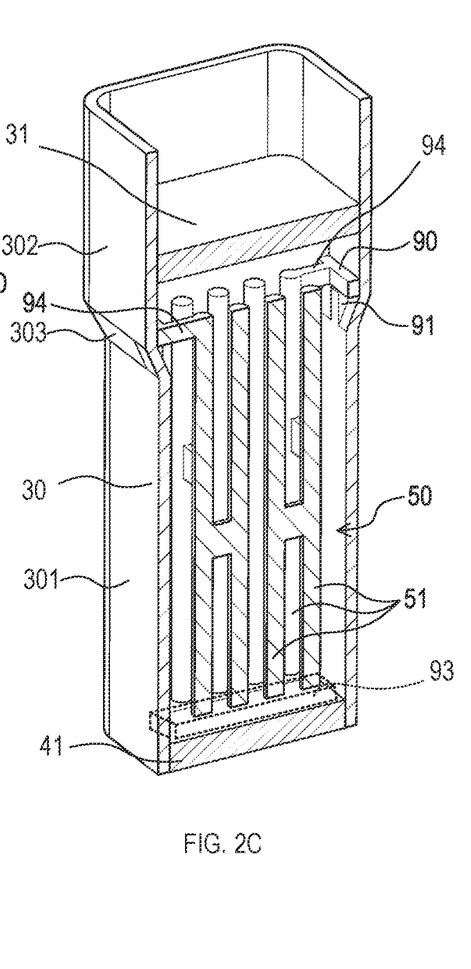
FIG. 2C is a cross-sectional perspective view of the second chamber and the adjustment member assembled together.
Figure 3:
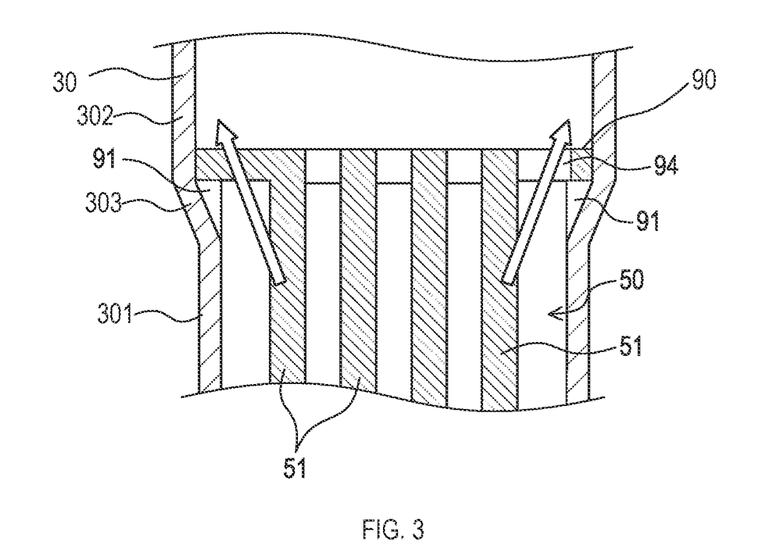
FIG. 3 is a diagram explaining a flow of purge air and fuel vapor in the vicinity of a positioning member.

As shown in FIG. 2A and FIG. 3, projecting portions 91 are disposed on the inner-circumferential surface of the joining portion 303. In FIG. 2A, FIG. 2C, and FIG. 3, the upper side of the drawings are the lid side, and the lower side of the drawings are the port side. The projecting portions 91 inhibit an adjustment member 50, which will be explained later, from moving towards the atmosphere port 13 by abutting positioning members 90, which will also be explained later. The projecting portions 91 are formed such that a part of the wall surface of the joining portion 303 protrudes towards the inner side of the second chamber 30. In the present embodiment, four projecting portions 91 are formed. Each of these four projecting portions 91 is situated separately on one of four side walls 44 of the rectangular parallelepiped second chamber 30. Each of the side walls 44 is arranged to face the one on the opposite side to make a pair. In FIG. 2A, only three projecting portions 91 and two side walls 44 are shown.

Each of the four projecting portions 91 is formed near the center of the side wall 44 in its width direction. The side walls 44 are four walls that surround the inner space (hereinafter referred to as the second space 42) of the second chamber 30. Two projecting portions 91 disposed on two side walls 44 that face each other are arranged point symmetrically with respect to the center of the cross section of the second chamber 30. Surfaces of the four projecting portions 91 facing the port side are formed flush with each other. Surfaces of the four projecting portions 91 facing the adjustment member 50, in other words, facing the inner side of the second chamber 30, are formed flush with the inner surfaces of the first cylinder 301. However, these surfaces of the four projecting portions 91 facing the inner side of the second chamber 30 do not have to be formed flush with the inner surfaces of the first cylinder 301.

1-2. Adjustment Member

In the canister 1 of the present disclosure, at least one of the at least one chamber arranged in the canister 1 is a target chamber. The target chamber is a chamber in which the adjustment member 50 is disposed along with the adsorbents 62. The target chamber is also a chamber to which a target port, which is at least one port among the inflow port 11, the outflow port 12, and the atmosphere port 13, is coupled. In the present embodiment, for example, the second chamber 30 is the target chamber, and the atmosphere port 13 is coupled to the target chamber. Instead of the second chamber 30, the first chamber 20 may be the target chamber; or both of the first chamber 20 and the second chamber 30 may be target chambers. Hereinafter, the adjustment member 50 disposed in the second chamber 30 will be described.

As shown in FIG. 1, the adjustment member 50 is disposed in the second space 42, the inner space of the second chamber 30, along with the adsorbents 62.

Figure 2B:
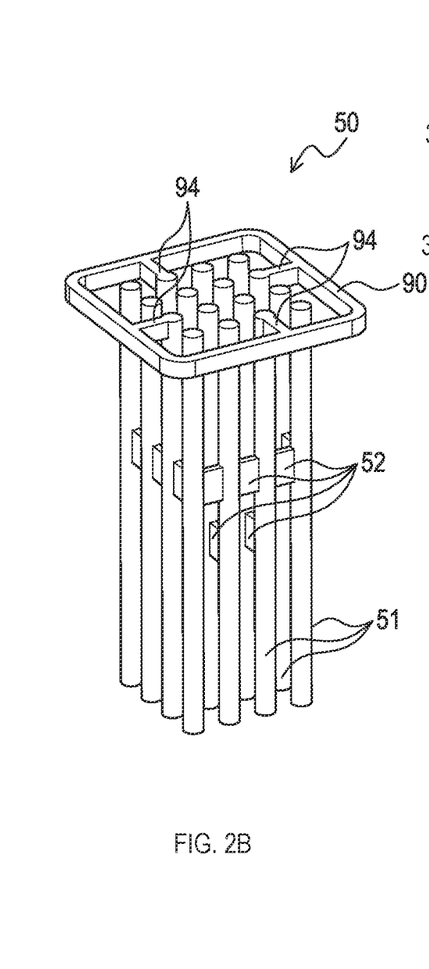
FIG. 2B is a perspective view of an adjustment member.

As shown in FIG. 2B, the adjustment member 50 comprises elongated rod-like members 51 and coupling members 52.

The rod-like members 51 extend linearly or approximately linearly. Approximately linear here means roughly straight as a whole. For example, a part of or all of the rod-like members 51 may be curved with small curvature. In other words, the example includes the rod-like members 51 that look linear at a glance. The rod-like members 51 extend in one direction or in approximately one direction. More specifically, the rod-like members 51 extend in a direction from the port side to the lid side of the second chamber 30, or in directions that are approximately identical to this direction. In other words, the rod-like members 51 are arranged along the flow direction of the purge air and the fuel vapor, or in directions that are approximately identical to this flow direction. More specifically, the longitudinal direction of the rod-like members 51 may be identical to the flow direction of the purge air and the fuel vapor, or may have a small angle to the flow direction.

Figure 4A:
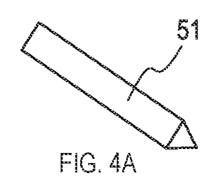
FIG. 4A is a perspective view of a modified example (triangular prism) of a rod-like member.
Figure 4B:
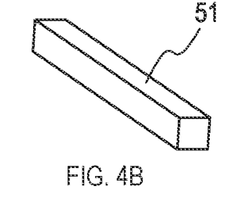
FIG. 4B is a perspective view of a modified example (square) of the rod-like member.
Figure 4C:
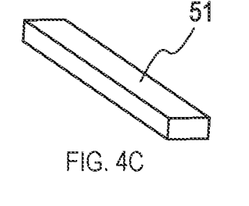
FIG. 4C is a perspective view of a modified example (rectangular) of the rod-like member.
Figure 4D:
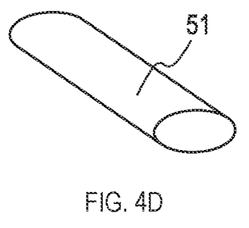
FIG. 4D is a perspective view of a modified example (oval) of the rod-like member.
Figure 4E:
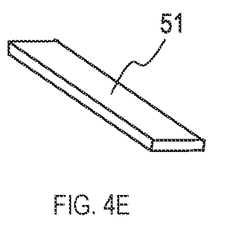
FIG. 4E is a perspective view of a modified example (belt-like shape) of the rod-like member.
Figure 4F:
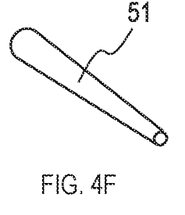
FIG. 4F is a perspective view of a modified example (tapered shape) of the rod-like member.
Figure 6:
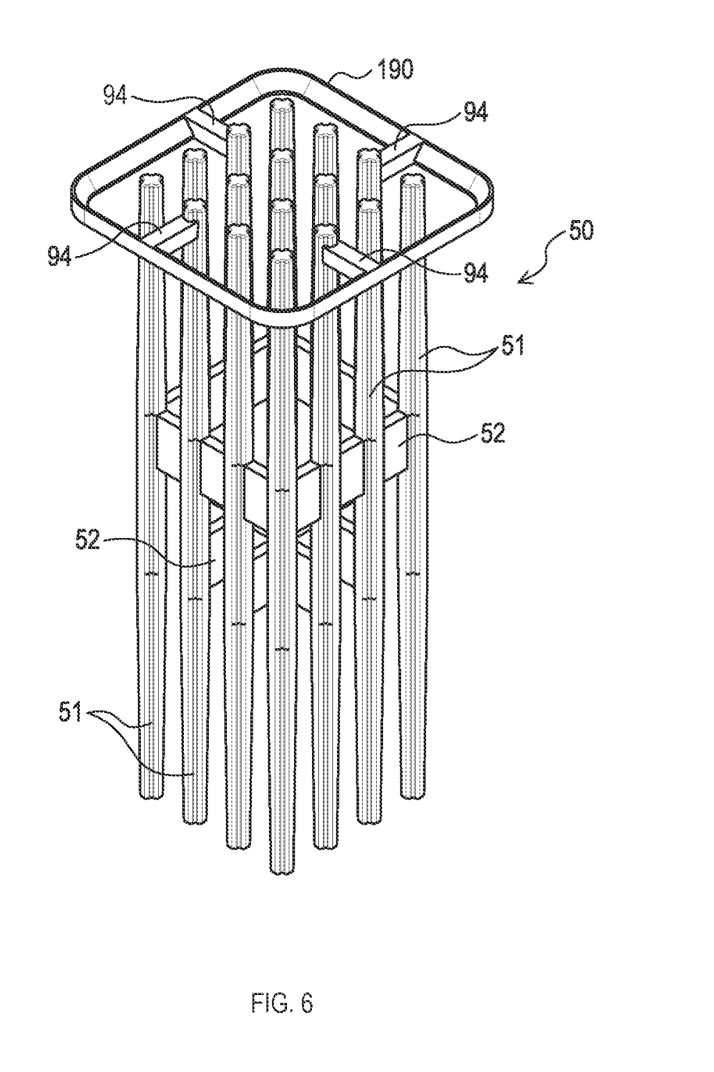
FIG. 6 is a perspective view of an adjustment member in a modified example.

Each of the rod-like members 51 has, for example, a circular cylindrical shape as shown in FIG. 1 and FIG. 2B. However, each of the rod-like members 51 may have a different shape. Specifically, each of the rod-like members 51 may have a shape with gradually decreasing diameter towards its leading end as shown in FIG. 4F and FIG. 6. For example, each of the rod-like members 51 may have a shape of a polygonal column. More specifically, each of the rod-like members 51 may have a shape of a triangular prism as shown in FIG. 4A, or may have a shape of a quadrangular prism having a cross section of a square or a rectangular as shown in FIG. 4B and FIG. 4C. For example, each of the rod-like members 51 may have an oval cross section as shown in FIG. 4D. For example, each of the rod-like members 51 may be formed into a belt-like shape as shown in FIG. 4E, or may have a tapered shape as shown in FIG. 4F. For example, each of the rod-like members 51 may have a cross-shaped (X-shaped) cross section as shown in FIG. 6.

Meanwhile, coupling members 52 are distributed among the rod-like members 51 and couple the rod-like members 51 into one connected member. In the present embodiment, the coupling members 52 are arranged at two different locations along the flow direction of the purge air and the fuel vapor. The adjustment member 50 may include the elongated rod-like members 51 and a coupling member 52.

The circumferential space (in other words, side space) of each of the rod-like members 51 makes one communicated space. In other words, the rod-like members 51 are situated a specified distance or more away from each other. Accordingly, there are no isolated space within the second space 42 regardless of the condition that the second space 42 accommodates the rod-like members 51.

Figure 5:
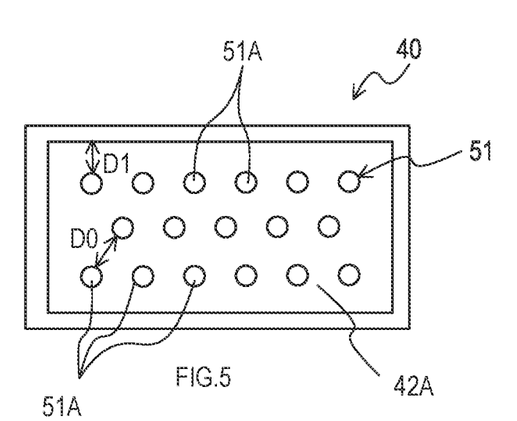
FIG. 5 is a schematic cross-sectional view of an internal space of the second chamber of the canister of the embodiment taken along the line V-V of FIG. 1.

As shown in FIG. 5, the rod-like members 51 are evenly or approximately evenly arranged along a cross section taken orthogonally to the longitudinal direction of the second chamber 30. The rod-like members 51 are arranged a specified distance or more away from the side walls 44, which are four walls that surround the second space 42. The rod-like members 51 are disposed to extend through the center of the width direction or the vicinity of the center of the width direction of the second space 42.

As shown in FIG. 2B, the adjustment member 50 includes a positioning member 90. The positioning member 90 is insertable in the second cylinder 302; however, it is not insertable in the first cylinder 301. Accordingly, the positioning member 90 enables positioning of the adjustment member 50 in the second chamber 30. The positioning member 90 is formed annularly to fit along the inner-circumferential surface of the second cylinder 302 in a circumferential direction. In other words, the length of the outer circumference of the positioning member 90 is shorter than the length of the inner-circumferential surface of the second cylinder 302 but is longer than the length of the inner-circumferential surface of the first cylinder 301. When the second chamber 30 has a circular cylindrical shape, the diameter of the positioning member 90 is smaller than the diameter of the second cylinder 302 but is larger than the diameter of the first cylinder 301. The positioning member 90 couples to the rod-like members 51 via joining members 94 that extend from ends of the rod-like members 51 on the lid side. As shown in FIG. 2C, the positioning member 90 positions the adjustment member 50 by abutting the surfaces of the projecting portions 91 facing the port side. At the time of the abutment, a small clearance is created between the positioning member 90 and the side walls 44. The thickness of the positioning member 90 at its cross section is smaller than the distance from the side wall 44 of the first cylinder 301 to the side wall 44 of the second cylinder 302. In other words, the thickness of the positioning member 90 at its cross section is designed not to protrude from the inner-circumferential surface of the first cylinder 301 towards the inner side of the first cylinder 301.

As shown in FIG. 1, the second chamber 30 comprises a buffer area 93 in an area of the second space 42 on the port side. More specifically, the buffer area 93 is formed inside the first cylinder 301. In the present embodiment, the buffer area 93 is an area in which the rod-like members 51 are not disposed. For example, an entire area above 10 mm below the filter 41 is kept vacant and the adjustment member 50 is disposed below this vacant area. The buffer area 93 is narrower than the area where the adjustment member 50 is disposed in the flow direction. For example, the length of the vacant area where the adjustment member 50 is not disposed may be about 2 mm or may be a size of an average particle diameter of grains or powder of the adsorbents 62. The buffer area 93 may be situated on the port side of the target chamber such that its length in the flow direction is less than or equal to 30% of the length of the target chamber.

Figure 4G:
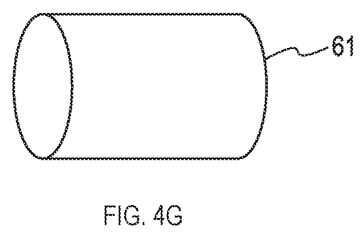
FIG. 4G is a perspective view of a pellet.

The adsorbents 62 disposed in the second chamber 30 may be aggregates of granular substances having a predetermined shape. Specifically, for example, the adsorbents 62 may be aggregates of pellets 61. The pellets 61 are granular activated carbons. The pellets 61 are produced by kneading powdery activated carbons with a binder and molding it into a specified shape. As shown in FIG. 4G, for example, the pellets 61 have a circular cylindrical shape in the present embodiment. The diameter of the bottom surface of a pellet 61 may be, for example, about 2 mm. The distance between the top surface and the bottom surface (in other words, the length) of the pellet 61 may be, for example, about 3 to 5 mm. The pellets 61 may have a different shape. Adsorbents other than the pellets 61, such as powdery activated carbons, may be disposed in the second chamber 30.

The distance between two adjacent rod-like members 51 (for example, DO in FIG. 5) is determined based on the size of the pellets 61. Specifically, the distance may be, for example, longer than either the diameter of the top and the bottom surfaces of the pellets 61 or the length of the pellets 61.

The minimum value of the distance between a lateral surface of each of the rod-like members 51 and the side wall 44 of the second space 42 (for example, D1 in FIG. 5) is also determined based on the size of the pellets 61. Specifically, the minimum value may be, for example, longer than either the diameter of the top and the bottom surfaces of the pellets 61 or the length of the pellets 61. In other words, the distance between the lateral surface of one or more rod-like members 51 disposed at the outermost side of all the rod-like members 51 and the side wall 44 of the second space 42 may be, for example, longer than either the diameter of the top and the bottom surfaces of the pellets 61 or the length of the pellets 61.

In FIG. 5, 42A represents a cross section of the second space 42. The sum of the area of the rod-like member 51 at the cross section is referred to as the sum of the cross sectional area. In FIG. 5, 51A represents a cross section of the rod-like members 51 at the cross section 42A. The number of the rod-like members 51 and the thickness of each of the rod-like members 51 may be designed such that the sum of the cross sectional area is within a range greater than or equal to 1% and less than or equal to 30% of the total area of the cross section 42A. Accordingly, the ventilation resistance can be reduced in the second chamber 30 while favorably performing fuel adsorption and desorption.

For example, in the cross section 42A shown in FIG. 5, the sum of the cross sectional area is about 7.5% of the total area of the cross section 42A.

In the present embodiment, the second space 42 is an elongated space having a constant width. Each of the rod-like members 51 has a circular cylindrical shape having a constant width. In other words, no matter where the cross section 42A is situated in the second space 42, the size of the cross section 42A and the cross sectional area of each of the rod-like members 51 are constant.

Nevertheless, the width of the second space 42 and/or the width of each of the rod-like members 51 do not have to be constant. In other words, the size of the cross section 42A and/or the cross sectional area of each of the rod-like members 51 may vary depending on where the cross section 42A is situated in the second space 42. In such a case, regardless of the place to situate the cross section 42A, the number of the rod-like members 51 and the thickness of each of the rod-like members 51 may still be designed such that the sum of the cross sectional area is within a range greater than or equal to 1% and less than or equal to 30% of the total area of the cross section 42A. In the present embodiment, the sum of the cross sectional area in the buffer area 93 is 0% of the total area of the cross section 42A, and the pellets 61 are packed in the buffer area 93. The sum of the cross sectional area in the buffer area 93 may be any value as long as it is smaller than the sum of the cross sectional area in any areas in the second space 42 other than the buffer area 93.

1-3. Effect

According to the embodiment described in detail above, the following effects can be obtained.

(1a) The positioning member 90 is insertable in the second cylinder 302 but is not insertable in the first cylinder 301. Such configuration is able to inhibit the adjustment member 50 from moving towards the port side, and accordingly inhibit a decrease in the uniformity of the gas flow velocity caused by the rod-like members 51 in the vicinity of the target port.

(1b) The joining portion 303 is disposed between the first cylinder 301 and the second cylinder 302 and forms a portion the cross sectional area of which increases along a direction moving away from the atmosphere port 13. Suppose a case in which the second chamber 30 does not comprise the joining portion 303, and the second cylinder 302 is situated away from the atmosphere port 13 and have a large cross sectional area compared with the first cylinder 301. In other words, suppose a configuration in which a right angled level difference is created at the connection of the first cylinder 301 and the second cylinder 302. In such a configuration, the flow of the purge air and the fuel vapor looses smoothness at this level difference. However, since there are no level differences formed in the joining portion 303 in the aforementioned configuration, the purge air and the fuel vapor can flow smoothly.

(1c) The projecting portions 91 inhibits the adjustment member 50 from moving towards the atmosphere port 13 by abutting the positioning member 90. Such configuration makes a reliable fixing of the adjustment member 50 possible since the projecting portions 91 abut the positioning member 90.

(1d) The positioning member 90 is formed annularly to fit along the inner-circumferential surface of the second cylinder 302 in the circumferential direction. Since the second chamber 30 has a rectangular parallelepiped shape, such configuration makes it possible to inhibit the positioning member 90 from rotating to move the adjustment member 50 from a given position. If the second chamber 30 has a cylindrical shape, the surface of the positioning member 90 abuts the projecting portion 91 regardless of the orientation of the inserted positioning member 90 in the circumferential direction. This makes the assembly of the second chamber 30 and the adjustment member 50 easy.

(1e) The canister 1 includes the buffer area 93 in which no rod-like members 51 are disposed. Such configuration is able to favorably inhibit a decrease in the uniformity of the gas flow velocity caused by the rod-like members 51. Accordingly, the breakthrough of the fuel vapor can be favorably reduced.

(1f) The size of the pellets 61 determines the distance between the rod-like members 51 located adjacent to each other. Accordingly, there are reasonable size of clearances between each of the rod-like members 51. As a consequence, the pellets 61 spread in the entire space between each of the rod-like members 51. This makes it possible to inhibit an excessively large gap from being created between the pellets 61 that fill the clearances. The clearances are therefore reasonably filled with the pellets 61.

(1g) The size of the pellets 61 determines the minimum value of the distance between the lateral surface of each of the rod-like members 51 and the side walls 44 of the second space 42. Accordingly, there are reasonable size of clearances between the side walls 44 and each of the rod-like members 51. As a consequence, the pellets 61 spread in the entire space between the side walls 44 and each of the rod-like members 51. This inhibits an excessively large gap from being created between the pellets 61 that fill the clearances. The clearances are therefore reasonably filled with the pellets 61.

(1h) The number of the rod-like members 51 and the thickness of each of the rod-like members 51 are designed such that the sum of the cross sectional area is within a range greater than or equal to 1% and less than or equal to 30% of the total area of the cross section 42A of the second space 42. This makes it possible to reduce the ventilation resistance while favorably performing fuel adsorption and desorption in the second chamber 30. If the sum of the cross sectional area in the buffer area 93 is less than or equal to one third of the sum of the cross sectional area in the area other than the buffer area 93, the effect described in the above (1e) improves remarkably. In a case where the sum of the cross sectional area in the area other than the buffer area 93 is about 7.5% of the entire area of the cross section 42A as in the present embodiment, the effect improves remarkably when the sum of the cross sectional area in the buffer area 93 is less than or equal to 2.5% of the entire area of the cross section 42A.

(1i) The buffer area 93 is situated in the second chamber 30 to which the atmosphere port 13 is coupled. In such a configuration, the buffer area 93 is situated near the atmosphere port 13; and therefore, it is possible to inhibit the fuel vapor from passing through the target chamber and being discharged to the atmosphere from the atmosphere port 13 without being adsorbed by the adsorbents 62.

2. Other Embodiments

Although the embodiment of the present application have been explained, the present disclosure may also be implemented in various other forms without being limited to the above embodiment.

(2a) In the aforementioned embodiment, the canister 1 comprises two chambers. Nevertheless, in a case where the canister comprises one chamber or three or more chambers, at least one chamber may still be designed as the target chamber in which the adjustment member 50 is disposed.

(2b) In the aforementioned embodiment, the rod-like members 51 extend along the flow direction of the fuel vapor and the purge air, and are disposed in the at least one target chamber. The rod-like members 51 also extend linearly or approximately linearly. Nevertheless, the rod-like members 51 may include one or more curves or bends and extend in the flow direction. The rod-like members 51 may also include a portion helically extending along the flow direction, for example. In addition, each of the rod-like members 51 may have a shape different from each other.

The rod-like members 51 may extend in a direction different from the flow direction of the fuel vapor and the purge air. Each of the rod-like members 51 may extend in a direction different from each other. In a case where three or more rod-like members 51 are disposed, two of them may extend in the same direction and the others may extend in a different direction.

(2c) In the aforementioned embodiment, the example shows the configuration in which the buffer area 93 is situated by the atmosphere port 13. Nevertheless, the location of the buffer area 93 is not limited to this example. For example, the buffer area 93 may be situated in a chamber to which the inflow port 11 or the outflow port 12 is coupled. More specifically, an adjustment member may be disposed in the first chamber 20 in FIG. 1. The adjustment member may also be disposed at a location apart from the inflow port 11 or the outflow port 12. For example, the entire area above 10 mm below the filter 21 may be kept vacant when disposing the adjustment member 50. Alternatively, there may be no buffer area 93. In other words, the rod-like members 51 may extend from the end of the first cylinder 301 on the lid side to the other end on the port side.

(2d) In the aforementioned embodiment, the example shows the configuration in which the adjustment member 50 is not disposed in the buffer area 93. Nevertheless, the configuration of the buffer area 93 is not limited to this example. The only condition of the buffer area 93 is that the area of the rod-like members 51 at a cross section of the buffer area 93 is smaller than the area of the rod-like members 51 at a cross section of a more distant area which is further away from the atmosphere port 13 than the buffer area 93. For example, the buffer area 93 may be configured to include relatively less rod-like members 51 than the more distant area in the second chamber 30 further away from the atmosphere port 13 than the buffer area 93. In addition, the buffer area 93 may be configured to include relatively thinner rod-like members 51 than the more distant area in the second chamber 30 further away from the atmosphere port 13 than the buffer area 93.

These configurations make it possible to maintain high uniformity of the flow velocity of the purge air and the fuel vapor in the buffer area 93 since the number or area of the rod-like members 51 disposed in the buffer area 93, which is situated by the end of the second chamber 30 communicating with the atmosphere port 13, is small. If a relatively large amount of the fuel vapor passes in the vicinity of the adjustment member 50 with low uniformity, the adsorbents 62 near the adjustment member 50 reach the point of saturation, where they cannot adsorb any more fuel vapor, relatively early. However, in the aforementioned configuration, it is possible to favorably reduce the amount of the fuel vapor that passes the buffer area 93 without being adsorbed by the adsorbents 62. In a case where the buffer area 93 is situated on the port side, it is more possible to reduce the breakthrough of the fuel vapor than in a case where the buffer area 93 is not situated on the port side. Accordingly, it is possible to reduce the ventilation resistance of the canister 1 while inhibiting the breakthrough of the fuel vapor.

(2e) In the aforementioned embodiment, the example shows the configuration in which the joining portion 303 comprises four projecting portions 91. Nevertheless, the number of the projecting portions 91 is not limited to this example. For example, the joining portion 303 may comprise three or less projecting portions 91, or the joining portion 303 may comprise five or more projecting portions 91.

The joining portion 303 may comprise no projecting portions. In this case, the positioning member 90 may be configured such that the diameter of the annular portion of the positioning member 90 expands from its end close to the first cylinder 301 to another end close to the second cylinder 302. In other words, the positioning member 90 may be formed into a tapered shape along the inner-circumferential surface of the joining portion 303. Such configuration makes it possible to fix the position of the adjustment member 50 by having the outer-circumferential surface of the positioning member 90 abut the inner-circumferential surface of the joining portion 303.

(2f) In the aforementioned embodiment, the example shows the configuration in which the positioning member 90 is formed annularly. Nevertheless, the shape of the positioning member 90 is not limited to this example. For example, it is only required that the positioning member 90 is formed annularly as a whole but this annular shape may be discontinuous. In addition, the positioning member does not have to be formed annularly. For example, the positioning member 90 may be formed to include hook-like ends of the rod-like members 51 extending to catch the projecting portions 91.

Figure 7:
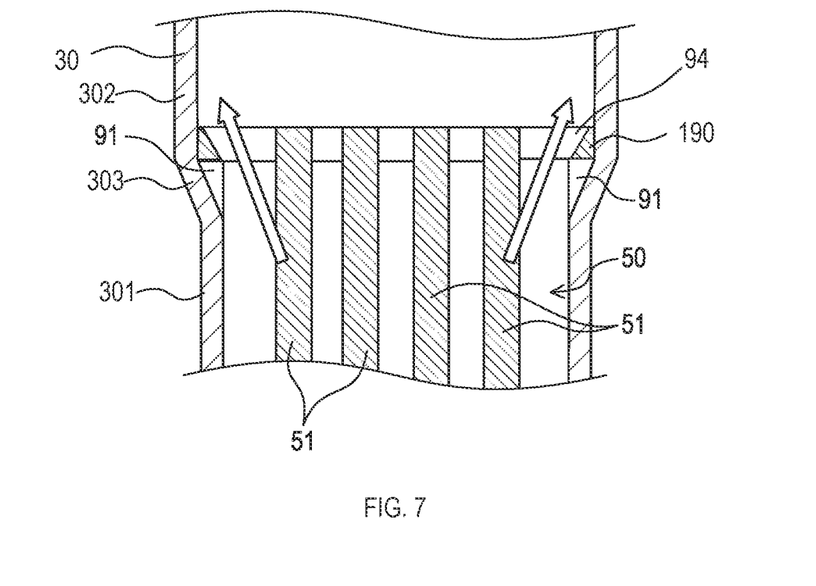
FIG. 7 is a diagram explaining a flow of purge air and fuel vapor in the vicinity of a positioning member in a modified example.

Alternatively, a positioning member 190 may be formed as shown in FIG. 6 and FIG. 7. The positioning member 190 may be formed such that its thickness in its width direction measured along its cross section decreases from its end by the first cylinder 301 towards its other end by the second cylinder 302 (for example, from the lower side to the upper side in the drawing of FIG. 7). In other words, a cross section of the positioning member 190 taken along the flow direction may be approximately triangular. Differently put, the positioning member 190 is formed annularly; and the cross sectional area of the inner space surrounded by the inner-circumferential surface of the positioning member 190 expands as the cross section is taken further away from the first cylinder 301. Such configuration makes the purge air and the fuel vapor flow smoothly from the first cylinder 301 towards the second cylinder 302 in the vicinity of the positioning member 190.

The positioning members 90, 190 do not have to be formed along the inner-circumferential surface of the second cylinder 302 when the positioning members 90, 190 have an annular shape. For example, the positioning members 90, 190 may have a triangular shape when the second cylinder 302 has a rectangular parallelepiped shape. In such a configuration, the positioning members 90, 190 cannot rotate largely since they contact the side wall 44 when they rotate. This makes it possible to inhibit misalignment of the adjustment member 50 from a specified position.

(2g) One or more functions of one element in the aforementioned embodiment may be achieved by two or more elements. One or more functions of two or more elements may be integrated into one element. A part of the configuration in the aforementioned embodiments may be omitted. At least a part of the configuration in the aforementioned embodiments may be added to or replaced with other part of the configuration in the aforementioned embodiments.

Technical Idea Disclosed in Present Application

Item 1

Item 1 is a canister including at least one chamber and mounted to a vehicle having an engine. The canister comprises an inflow port, adsorbents, an atmosphere port, an outflow port, and an adjustment member.

The inflow port is configured to introduce fuel vapor from a fuel tank of the vehicle to the at least one chamber.

The adsorbents are configured to adsorb the fuel vapor and disposed in each of the at least one chamber.

The atmosphere port is configured to introduce atmospheric air from outside of the vehicle to the at least one chamber.

The outflow port is configured to release the fuel vapor adsorbed by the adsorbents towards the engine using atmospheric air entered from the atmosphere port.

The adjustment member comprises rod-like members.

At least one of the at least one chamber is a target chamber.

The target chamber is coupled to a target port, which is at least one of the inflow port, the atmosphere port, or the outflow port.

The adjustment member is disposed with the adsorbents in the target chamber.

The target chamber comprises a first cylinder, a second cylinder, and a joining portion.

The first cylinder has a cylindrical shape that forms a wall surface of the target chamber.

The second cylinder has a cylindrical shape and disposed away from the first cylinder when viewed from the target port. A cross sectional area at a cross section of the second cylinder taken orthogonally to a flow direction of the fuel vapor and the atmospheric air is larger than a cross sectional area at a cross section of the first cylinder.

The joining portion has a cylindrical shape and disposed between the first cylinder and the second cylinder. A cross sectional area of the joining portion increases towards a direction moving away from the target port.

The adjustment member comprising a positioning member. The positioning member is configured to enable positioning of the adjustment member in the target chamber by being insertable in the second cylinder and by not being insertable in the first cylinder.

Item 2

Item 2 is the canister of item 1. In item 2, at least one projecting portion is formed on an inner-circumferential surface of the joining portion, and the at least one projecting portion inhibits the adjustment member from moving towards the target port by abutting the positioning member.

Item 3

Item 3 is the canister of item 1 or item 2. In item 3, the target chamber comprises a buffer area in an area by the target port, and a cross sectional area of the rod-like members at a cross section of the buffer area is smaller than a cross sectional area of the rod-like members at a cross section of the target chamber taken further away from the target port than the buffer area.

Item 4

Item 4 is the canister of item 3. In item 4, the buffer area is an area where the adjustment member is not disposed.

Item 5

Item 5 is the canister of any one of items 1 to 4. In item 5, the positioning member is formed annularly to fit along an inner-circumferential surface of the second cylinder in a circumferential direction.

Item 6

Item 6 is the canister of any one of items 1 to 5. In item 6, a thickness of the positioning member measured along its cross section decreases from the first cylinder towards the second cylinder.

What is claimed is:

1. A canister including at least one chamber and mounted to a vehicle having an engine, the canister comprising:
    an inflow port configured to introduce fuel vapor from a fuel tank of the vehicle to the at least one chamber;
    adsorbents configured to adsorb the fuel vapor and disposed in each of the at least one chamber;
    an atmosphere port configured to introduce atmospheric air from outside of the vehicle to the at least one chamber;
    an outflow port configured to release the fuel vapor adsorbed by the adsorbents towards the engine using atmospheric air entered from the atmosphere port; and
    an adjustment member comprising rod-like members,
        at least one of the at least one chamber being a target chamber,
    the target chamber being coupled to a target port, which is at least one of the inflow port, the atmosphere port, or the outflow port,
        the adjustment member being disposed with the adsorbents in the target chamber,
    the target chamber comprising:
        a first cylinder having a cylindrical shape that forms a wall surface of the target chamber,
        a second cylinder having a cylindrical shape and disposed away from the first cylinder when viewed from the target port, a cross sectional area at a cross section of the second cylinder taken orthogonally to a flow direction of the fuel vapor and the atmospheric air being larger than a cross sectional area at a cross section of the first cylinder; and
        a joining portion having a cylindrical shape and disposed between the first cylinder and the second cylinder, a cross sectional area of the joining portion gradually and circumferentially increases towards a direction moving away from the target port,
    the cross section being any cross section taken orthogonally to the flow direction of the fuel vapor and the atmospheric air, the adjustment member comprising:
  a positioning member configured to enable positioning of the adjustment member in the target chamber by being insertable in the second cylinder and by not being insertable in the first cylinder;
  wherein at least one projecting portion is formed on an inner-circumferential surface of the joining portion, and
  wherein the at least one projecting portion inhibits the adjustment member from moving towards the target port by abutting the positioning member.

2. The canister according to claim 1,
  wherein the target chamber comprises a buffer area in an area by the target port, and
  wherein a cross sectional area of the rod-like members at a cross section of the buffer area is smaller than a cross sectional area of the rod-like members at a cross section of the target chamber taken further away from the target port than the buffer area.

3. The canister according to claim 1,
  wherein the target chamber comprises a buffer area in an area by the target port, and
  wherein the buffer area is an area where the adjustment member is not disposed.

4. The canister according to claim 1,
  wherein the positioning member is formed annularly to fit along an inner-circumferential surface of the second cylinder in a circumferential direction.

5. The canister according to claim 1,
  wherein a thickness of the positioning member measured along its cross section decreases from the first cylinder towards the second cylinder.

6. A canister including at least one chamber and mounted to a vehicle having an engine, the canister comprising:
  an inflow port configured to introduce fuel vapor from a fuel tank of the vehicle to the at least one chamber;
  adsorbents configured to adsorb the fuel vapor and disposed in each of the at least one chamber;
  an atmosphere port configured to introduce atmospheric air from outside of the vehicle to the at least one chamber;
  an outflow port configured to release the fuel vapor adsorbed by the adsorbents towards the engine using atmospheric air entered from the atmosphere port; and
  an adjustment member comprising rod-like members,
    at least one of the at least one chamber being a target chamber, the target chamber being coupled to a target port, which is at least one of the inflow port, the atmosphere port, or the outflow port,
    the adjustment member being disposed with the adsorbents in the target chamber, the target chamber comprising:
      a first cylinder having a cylindrical shape that forms a wall surface of the target chamber,
      a second cylinder having a cylindrical shape and disposed away from the first cylinder when viewed from the target port, a cross sectional area at a cross section of the second cylinder taken orthogonally to a flow direction of the fuel vapor and the atmospheric air being larger than a cross sectional area at a cross section of the first cylinder; and
      a joining portion having a cylindrical shape and disposed between the first cylinder and the second cylinder, a cross sectional area of the joining portion gradually and circumferentially increases towards a direction moving away from the target port,
    the cross section being any cross section taken orthogonally to the flow direction of the fuel vapor and the atmospheric air,
  the adjustment member comprising:
    a positioning member configured to enable positioning of the adjustment member in the target chamber by being insertable in the second cylinder and by not being insertable in the first cylinder;
    wherein a thickness of the positioning member measured along its cross section decreases from the first cylinder towards the second cylinder.

\* \* \* \* \*